United States Patent
Chintagunta et al.

(10) Patent No.: US 11,132,191 B2
(45) Date of Patent: Sep. 28, 2021

(54) SOFTWARE AND FIRMWARE UPDATES OF COMPUTING SYSTEMS

(71) Applicant: Hewlett Packard Enterprise Development LP, Houston, TX (US)

(72) Inventors: Murali Mohan Chakravarthy Chintagunta, Karnataka (IN); Lakshmi Prabha KrishnaKumar, Karnataka (IN); Poorna Murali Thoyakkat, Karnataka (IN); Venkata Asha Sirish Nimmakayala, Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/567,036

(22) Filed: Sep. 11, 2019

(65) Prior Publication Data

US 2021/0072976 A1    Mar. 11, 2021

(51) Int. Cl.
    *G06F 9/44*      (2018.01)
    *G06F 8/658*    (2018.01)
    *H04L 29/08*    (2006.01)
    *G06F 8/61*      (2018.01)
    *G06F 8/656*    (2018.01)

(52) U.S. Cl.
    CPC ............ *G06F 8/658* (2018.02); *G06F 8/63* (2013.01); *G06F 8/656* (2018.02); *H04L 67/34* (2013.01)

(58) Field of Classification Search
    CPC ...................................................... G06F 8/65
    USPC ...................................................... 717/168
    See application file for complete search history.

(56) References Cited

U.S. PATENT DOCUMENTS

| | | | |
|---|---|---|---|
| 7,761,503 B2 | 7/2010 | Dhawan et al. | |
| 7,761,735 B2 | 7/2010 | Ellsworth et al. | |
| 8,166,185 B2 * | 4/2012 | Samuel | H04L 45/00 709/230 |
| 9,110,761 B2 * | 8/2015 | Nelson | G06F 8/654 |
| 9,235,404 B2 | 1/2016 | Cavalaris et al. | |
| 9,772,838 B2 * | 9/2017 | Cavalaris | G06F 8/654 |
| 9,792,109 B2 * | 10/2017 | Bainville | G06F 8/71 |
| 10,067,858 B2 * | 9/2018 | McDonald | G06F 11/0772 |
| 10,599,427 B2 * | 3/2020 | Bainville | G06F 8/65 |
| 10,713,041 B1 * | 7/2020 | Chandrasekaran | G06F 16/9566 |
| 10,776,492 B2 * | 9/2020 | Samuel | G06F 8/654 |
| 10,860,310 B2 * | 12/2020 | Bainville | G06F 8/658 |
| 10,922,413 B2 * | 2/2021 | Mihm | G06F 9/4401 |

(Continued)

OTHER PUBLICATIONS

Adaptiva: "Onesite Content Pre-staging in Configmgr"; Apr. 30, 2012, 6 pages.

(Continued)

*Primary Examiner* — Francisco J Aponte
(74) *Attorney, Agent, or Firm* — Hewlett Packard Enterprise Patent Department

(57) ABSTRACT

Example implementations relate to software updates of a plurality of computing systems. An example system includes a plurality of computing systems including a first computing system and a second computing system. The first computing system includes a first board management controller and the second computing system includes a second board management controller. The first computing system and the second computing system are capable of staging from each other through the first board management controller and the second board management controller via a network protocol.

10 Claims, 4 Drawing Sheets

(56) References Cited

U.S. PATENT DOCUMENTS

| | | | |
|---|---|---|---|
| 2013/0179872 A1* | 7/2013 | Kuzmack | G06F 9/45533 |
| | | | 717/173 |
| 2016/0321067 A1* | 11/2016 | Harrison | G06F 8/71 |
| 2018/0091624 A1* | 3/2018 | Forbes | G06F 8/60 |
| 2018/0136970 A1* | 5/2018 | Nandagopal | G06F 9/4843 |
| 2018/0150292 A1* | 5/2018 | Linn | G06F 8/656 |
| 2018/0314510 A1* | 11/2018 | Roy-Chowdhury | G06F 8/65 |
| 2019/0220271 A1* | 7/2019 | Olderdissen | G06F 8/654 |
| 2020/0019400 A1* | 1/2020 | Zhao | G06F 8/71 |
| 2020/0104118 A1* | 4/2020 | Lai | H04L 67/34 |
| 2020/0186445 A1* | 6/2020 | Govindaraju | H04L 41/5029 |
| 2020/0257518 A1* | 8/2020 | Liedtke | G06F 8/65 |
| 2020/0326919 A1* | 10/2020 | Kaler | H04L 67/34 |
| 2020/0326923 A1* | 10/2020 | Kaler | G06N 20/00 |
| 2020/0326930 A1* | 10/2020 | Suryanarayana | G06F 8/654 |
| 2020/0341744 A1* | 10/2020 | Suryanarayana | G06F 13/1668 |
| 2020/0394303 A1* | 12/2020 | Suryanarayana | G06F 8/654 |
| 2021/0081188 A1* | 3/2021 | Rajagopalan | G06F 8/65 |

OTHER PUBLICATIONS

Czechowski, A., et al.; "Manually deploy software updates", Jul. 30, 2018; 15 pages.

Juniper; "Prestaging Workflow in Connectivity Services Director"; Modified: Sep. 21, 2015; 2 pages.

Cisco, "Cisco IP Phone Feature—Peer Firmware Sharing", available online at <https://www.cisco.com/c/en/us/support/docs/unified-communications/unified-communications-manager-callmanager/200615-Cisco-IP-Phone-Feature-Peer-Firmware-S.html>, May 23, 2018, 7 pages.

* cited by examiner

SOFTWARE AND FIRMWARE UPDATES OF COMPUTING SYSTEMS

BACKGROUND

Computing systems, for example, laptops, desktops, personal digital assistants (PDAs), servers, internet appliances, switches, and combinations thereof generally include different components, such as input/output (I/O) cards, Basic Input/Output System (BIOS), and device drivers. Such components generally contain software, firmware or any other suitable code that is executed to perform desired functionalities. Different components of the computing systems may be updated with new software/firmware version time to time. In an environment where servers are utilized to provide various functionalities, the software/firmware of BIOS, I/O cards, and drivers may be frequently updated to provide the servers with most recent functionalities and capabilities.

BRIEF DESCRIPTION OF THE DRAWINGS

For a more complete understanding of various examples, reference is now made to the following description taken in connection with the accompanying drawings in which the same numbers are used throughout the drawings to reference like features and components.

DETAILED DESCRIPTION

Figure 1:
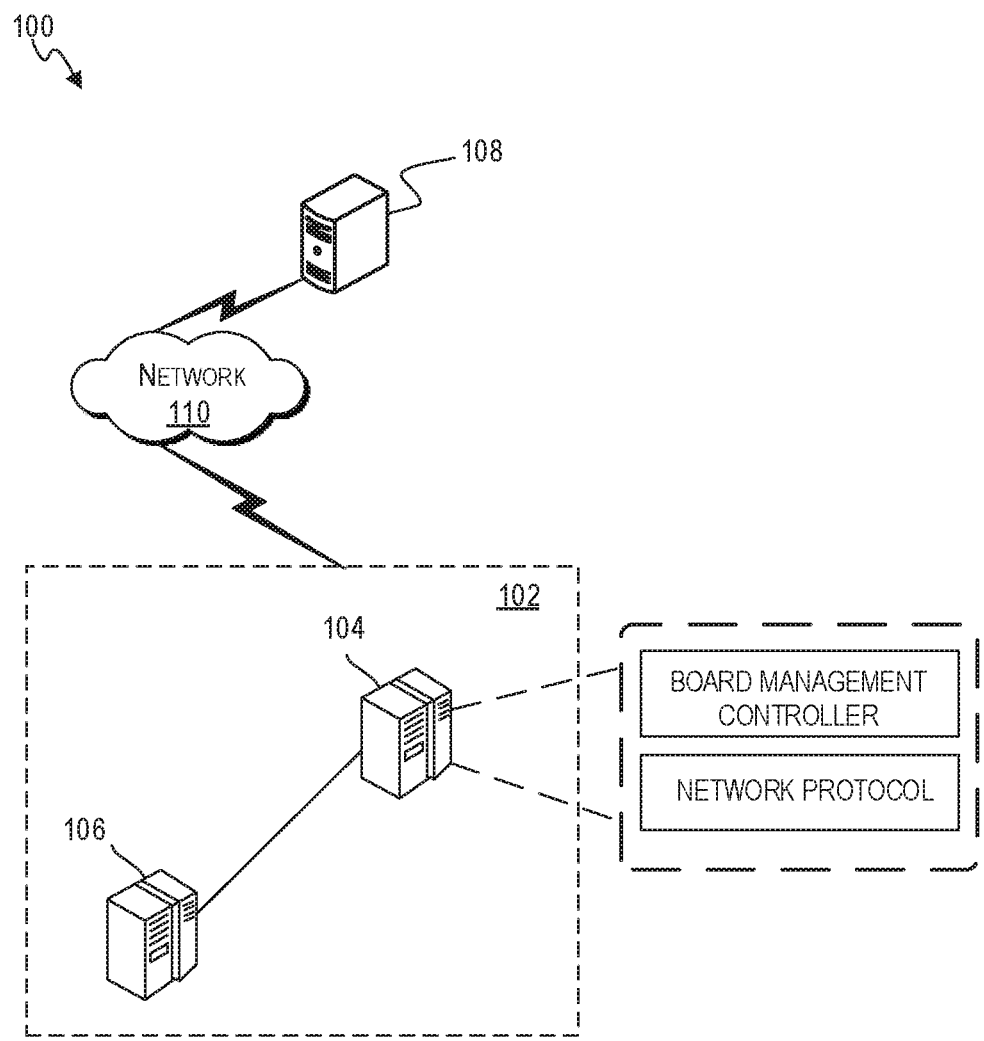
FIG. 1 illustrates an example computing environment including a plurality of computing systems and a management controller for software updates.

The present subject matter relates to systems and methods for updating software to computing systems. Within the life time of a computing system, many new versions of software may be released by independent hardware vendors (IHVs) and original equipment manufacturers (OEMs) which may include important updates or patches. Different organizations may install such software updates to keep their computing systems up-to-date with the new versions of software that may also include additional functionalities/features. Therefore, installation of these new versions of software on computing systems in organizations may not be a onetime activity, and these computing systems may have to be updated with new versions of software from time to time.

As used herein, the term "software updates" or "updating software" refers to updating software, updating firmware, or both. In one example, software updates may include a software update, a firmware update or a combination thereof. In such examples, installing software updates includes installing new software versions, installing new firmware versions or installing both new software versions and new firmware versions. For the sake of explanation, "updating software" has been also referred to as "installing software", or "driver updates", and are used interchangeably herein. These terms may also be referred to as "installing the software updates".

It would be understood that for software updates, a software package is processed to copy the payload bits (also referred to as software component bits) to a resource that has to be updated. The software package may include a firmware package. Furthermore, it would be understood that for software updates, a firmware image may be installed by a computing system; a software patch may be installed by the computing system, or both the firmware image and the software patch may be installed.

Generally, updates of the computing systems may include many functionalities including, but not limited to, BIOS updates, management firmware updates, I/O firmware image updates, provider agent updates, and device driver updates. To manage such different types of updates in the computing systems, management controllers are generally implemented by organizations which provide out-of-band management capabilities, such as installation of new software versions onto the computing systems.

The process of updating computing systems with new version of software, usually, involves two steps—(i) staging each individual resource of the computing system, which needs to be updated, from a management controller; and (ii) installing and activating the payload bits on the resources.

As used herein, the term "staging" or "stage" or "staged" refers to copying the payload bits from a host to a resource. In particular, staging may involve accessing the host to process a software package, extracting the payload bits, and copying the payload bits to a designated storage location for installing the software updates. The term "non-staged", as used herein, means that the payload bits for updating the component may not be copied from a host. A resource may be a component of a computing system that needs to be updated. A host may be a device that provides a software package for the software updates. In one example, the host may be a management controller. In another example, the host may be a computing system that can be accessed for copying the payload bits for the software updates. In one example, the host may be a computing system that includes a component identical (described below) to the resource.

Typically, the process of installing and activating the payload bits on the resources needs a down time while the process of staging does not need a down time. However, in some examples, the down time is a summation of both the above steps as a customer might choose to start and complete the maintenance (i.e., overall update process) in a single maintenance window. Usually, staging consumes a large time (about 40 percent to about 65 percent of the overall update process), which adds up to down time for the overall update process. Furthermore, at any given maintenance window, a large network bandwidth is consumed to stage a component (that includes copying the payload bits) from the management controller to individual resources of the computing systems since the management environment is slower in terms of bandwidth capabilities as compared to a production environment. As a result, the load on the management controller increases due to increased network traffic, which makes the management controller a single point of failure.

According to examples of the present subject matter, systems and methods for organizing a plurality of computing systems for updating software onto the plurality of computing systems are described. The examples described herein may utilize computing systems of a plurality of computing systems, which may be capable of staging from one another. In one example, the computing systems may be capable of staging from one another via a network protocol. Further, the computing systems may also be monitored and controlled by a management controller which may provide various functionalities, including sending request for software updates and monitoring the software updates from time to time. In one example, the computing systems may be capable of communicating with one another through their board management controllers (BMCs) via the network protocol. The computing systems may be capable of communicating details of their components with one another such as versions of the components and status of the components. In such example, the computing systems may stage from one another for installing software updates. In another example, the management controller may send instructions to the computing systems for staging from one another.

As used herein, "a plurality of computing systems may be capable of staging from one another" or "staging a computing system from another computing system" means that a software package may be accessed and the payload bits may be copied to a designated storage location of a computing system from another computing system for installing the updates.

As used herein, the term "computing system" can, for example, refer to a device including a processor, memory, and input/output interfaces for wired and/or wireless communication. According to an example of the present subject matter, the computing systems of the plurality of computing systems may be, but are not limited to, servers, workstations, computers, and the like. The computing systems may also be machine readable instructions-based implementations, hardware-based implementations or combinations thereof. In one example of the present subject matter, the management controller may include, but is not restricted to, a server, a workstation, a desktop computer, a laptops, a smart phone, personal digital assistants (PDAs), a tablet, a virtual host, an application, and the like.

In one example of the present subject matter, a method may include organizing the plurality of computing systems for installing software updates. The organizing may include identifying a first component of a first computing system in the plurality of computing systems, identifying a second component of a second computing system in the plurality of computing systems, and instructing the second computing system for staging the second component from the first computing system. In said example, the second component may be identical to the first component, and the status of the first component may be staged and the second component may be non-staged. In one example, the method may further include retrieving an inventory information of the first component and the second component. The inventory information may include one or more information identifying the status of the first component and the status of the second component.

In one example, the inventory information may be individually retrieved by a first BMC of the first computing system and a second BMC of the second computing systems. In such example, the identifying the first component may include broadcasting the status of the first component to the second computing system and recognizing the status of the first component by the second computing system.

In another example, the method may include retrieving the inventory information of the first component and the second component by a management controller that is in communication with the plurality of computing systems. The management controller may determine the status of the first component and the status of the second component from the inventory information. In this way, the management controller may identify the first component as a host for the second component.

After identifying the status of first component, the plurality of computing systems may be organized for staging the second component from the first computing system. That is, the first computing system may be identified as a host for copying the payload bits onto the second computing system from the first computing system.

In one example, the described system and method may be utilized for organizing a plurality of computing systems for staging one or more computing systems of the plurality of computing systems from two or more computing systems. As described, a component of a computing system of the plurality of computing systems can be identified as a host that may provide a software package for the software updates and a component of another computing system can be identified as a resource that needs to be updated. In such examples, the plurality of computing systems may be organized for staging the resource from the host i.e., copying the payload bits from the host to the resource. Such organization of the plurality of computing systems for staging a computing system from another computing system prior to starting the process of software updates may be referred to as "pre-staging." Pre-staging may involve organizing a plurality of computing systems, in advance, for performing staging to subsequently install software updates. In one example, the computing systems of the plurality of computing systems may be organized for staging prior to receiving a request for updates.

As described, pre-staging may help in reducing the time consumed in staging which may reduce the maintenance time and overall down time while updating software onto the plurality of computing systems. Since the described systems and methods may organize a computing system for staging and installing the updates from neighboring computing systems instead the management controller, the load on the management controller may be reduced. By reducing the load on the management controller, the overall efficiency of installing software updates may improve due to reduced network traffic and processing time. Thus, the systems and methods of the present subject matter may advantageously improve overall efficiency and down time for software updates.

In examples where the plurality of computing systems may be organized prior to receiving a request for updates, staging can be processed immediately after receiving the request followed by installation of software updates, which may further reduces maintenance time.

The described systems and methods may be utilized for various computing systems connected through various networks. Although the description herein is with reference to computing systems of a datacenter environment such as servers, the methods and described techniques may be utilized in other devices, albeit with a few variations. Various implementations of the present subject matter have been described below by referring to several examples.

The above systems and methods are further described with reference to FIGS. 1-6. It should be noted that the description and figures merely illustrate the principles of the present subject matter along with examples described herein and, should not be construed as a limitation to the present subject matter. It is thus understood that various arrangements may be devised that, although not explicitly described or shown herein, embody the principles of the present subject matter. Moreover, all statements herein reciting principles, aspects, and embodiments of the present subject matter, as well as specific examples thereof, are intended to encompass equivalents thereof.

FIG. 1 schematically illustrates a block diagram of an example computing environment including a system 100, according to an example of the present subject matter. The computing environment may either be a public distributed environment or a private closed computing environment. As illustrated in FIG. 1, the system 100 includes a first computing system 104 and a second computing system 106 in a datacenter 102, and a management controller 108 in communication with the datacenter 102 via a network 110. The management controller 108, the first computing system 104 and the second computing systems 106 may individually include processor(s) (not shown) to run an operating system, other applications or services. The processor of the management controller 108 and the processor(s) of the first and second computing systems (104, 106) may be utilized as microprocessor(s), microcomputer(s), microcontroller(s), digital signal processor(s), central processing unit(s), state machine(s), logic circuit(s), and/or any device(s) that manipulates signals based on operational instructions. Among other capabilities, each processor may fetch and execute computer-readable instructions stored in a memory. The functions of the various 'processor(s)' may be provided through the use of dedicated hardware as well as hardware capable of executing machine readable instructions.

As described the management controller 108 may be a computing device for monitoring and controlling software updates of various components of the first computing system 104 and the second computing system 106, from time to time. The management controller 108 may be pre-configured with the software updates based on components of the first and second computing system (104, 106) and the software updates provided by vendors and original equipment manufacturer (OEMs). Further, the management controller 108 may also include different update policies defined by administrators for the purpose of updating software on components of the first and second computing systems (104, 106).

As noted, the first and second computing systems (104, 106) may communicate with different entities of the system 100, such as the management controller 108 through the network 110. The network 110 may be a wireless network, a wired network, or a combination thereof. The network 110 may also be an individual network or a collection of many such individual networks, interconnected with each other and functioning as a single large network, e.g., the Internet or an intranet. The network 110 may be implemented as one of the different types of networks, such as intranet, local area network (LAN), wide area network (WAN), and such. The network 110 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other.

The network 110 may also include individual networks, such as, but are not limited to, Global System for Communication (GSM) network, Universal Telecommunications System (UMTS) network, Long Term Evolution (LTE) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the implementation, the network 110 may include various network entities, such as base stations, gateways and routers; however, such details have been omitted to maintain the brevity of the description. Further, it may be understood that the communication between the first computing system 104 and the second computing system 106, the management controller 108, and other entities may take place based on the protocol compatible with the network 110.

Further, the first computing system 104 and the second computing system 106 may communicate with each other through the same network 110 as discussed above, a different network or a combination thereof. However, the first computing system 104 and the second computing system 106 may communicate with each other via a network protocol. In such example, the first and second computing systems (104, 106) may be enabled to stage from each other via the network protocol. In other words, the first and second computing systems (104, 106) may be capable of staging from each other via the network protocol. As used herein, the term "network protocol" refers to rules, procedures and formats that define communication between two or more devices over a network. In one example, the first and second computing systems (104, 106) may communicate with each other via Hypertext Transfer Protocol (HTTP URL) such as RESTful API.

Each of the first computing system 104 and the second computing system 106 may include a board management controller (BMC) for out of band management services. A BMC of a computing system may manage and control various functions for the purpose of staging, for example receiving update request from the management controller, identifying various components of the computing system, determining the status of the components, copying payload bits to a storage location and install firmware and software updates of the components of the computing system.

In said example, the first computing system 104 may include a first BMC and the second computing system 106 includes a second BMC. Both the first BMC and the second BMC may communicate and receive instructions from the management controller 108. Further, the first BMC and the second BMC may communicate with each other through their communication modules (as represented by a communication module 20 in FIG. 2 and described below) via the network protocol. In one example, the first BMC and the second BMC may communicate various details of the components such as the name of the components, unique identifications of the components, and versions of the components. In one example, the first BMC and the second BMC may be capable of communicating the details of a component that may be available in their memory locations. This way, the first BMC and the second BMC may enable communication between the first computing system 104 and the second computing system 106 and instruct the first computing system 104 and the second computing system 106 to stage from each other. In one example of the present subject matter, each of the first BMC and the second BMC may also perform other functionalities such as broadcasting status of a component, identifying an identical component of other computing system and its status, which are described in more detail in reference to FIG. 2.

Figure 2:
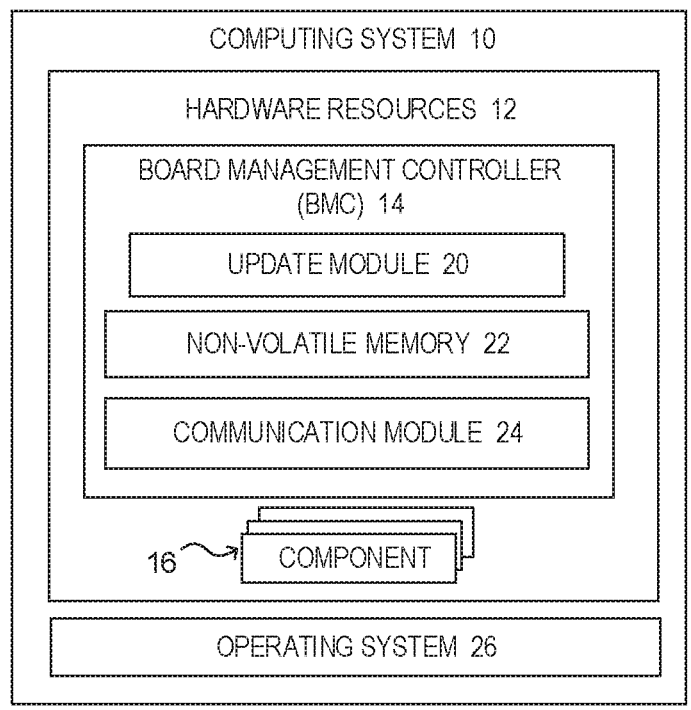
FIG. 2 illustrates various element of an example computing system of the plurality of computing systems.
Figure 3:
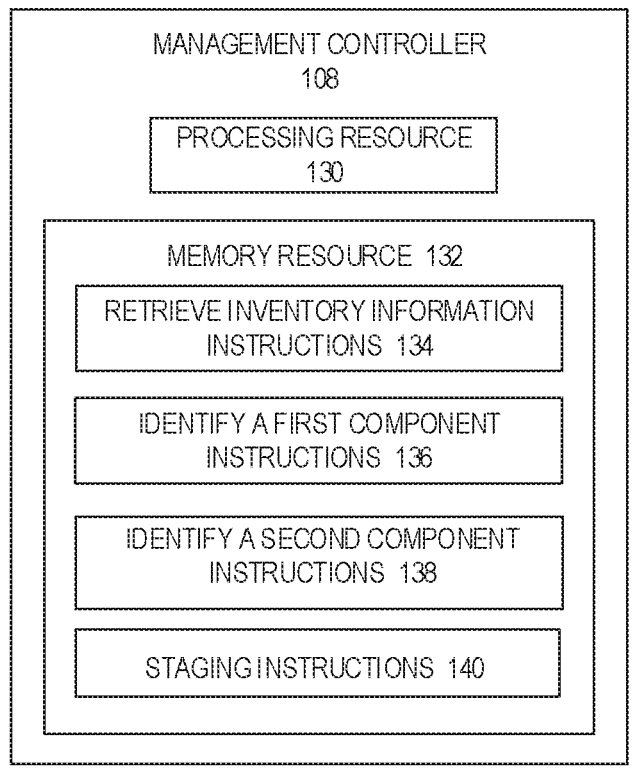
FIG. 3 illustrates a block diagram of an example management controller including a non-transitory computer readable storage medium including a set of instructions executable by a processor resource.

FIG. 2 schematically illustrate an example computing system 10 that may represent the first computing system 104 and the second computing system 106, according to one example of the present subject matter. For the sake of explanation, the following description describes the basic elements of the computing system 10. In said example, the computing system 10 may include hardware resources 12 that may include various components and devices of the computing system 10. The hardware resources 12 may include integrated components, removable components, and external peripheral devices connectable to the computing system 10 via wired and/or wireless connections. Apart from a BMC 14, the hardware resources 12 of the computing system 10 may include various components 16 that may be updated from time to time, with the techniques described above and below. The components 16 may include, but not limited to, input/output (I/O) cards, Basic Input/Output System (BIOS), Network Interface Card (NIC), and device drivers.

Referring to FIG. 2, the BMC 14 of the computing system 10 may include an update module 20 for receiving update requests and installing the updates, and a communication module 22 to communicate with the management controller 108 and other computing systems. The BMC 14 may include a non-volatile memory 24, such as NAND flash, that stores the update requests and information regarding the pre-staging determined by the BMC for staging and installing software updates. Further, the described techniques for the update of the firmware or software have been made in reference to updates which necessitate support of the operating system 26 running on the computing system 10. However, it would be understood that the concepts thereto may be extended to other out-of-band updates of the computing system 10 as well.

The operating system 26 of the computing system 10 may also include interface(s) (not shown). The interface(s) may include a variety of machine readable instructions-based interfaces and hardware interfaces that allow the operating system 26 of the computing system 10 to interact with different entities, such as the BMC 14. Further, the interface(s) may enable the BMC 14 of the computing system 10 to communicate with the management controller 108 and other computing systems.

The first computing system 104 and the second computing system 106 may have same basic elements and perform same basic functionalities, as described above with respect to the example computing system 10, as illustrated in FIG. 2. However, the first computing system 104 and the second computing system 106 may include various components (that are represented by the component 16 in FIG. 2) that may be same or different. In one example, the first computing system 104 may include at least one identical component to a component of the second computing system 106.

Every component of the first computing system 104 and the second computing system 106 may have a unique identification. The unique identification may be based on Device class (the type of the component), Vendor ID (the make of the component), and Device ID (the component). In one example, the unique identification may be Global Unique Identification Decimal (GUID) that includes a combination of Device class, Vendor ID, and device ID.

As used herein, the term "identical component" refers to a component of a first computing system 104, which may be of same type and perform same basic function as a component of the second computing system 106. In one example, the identical components may have same unique identification for example, GUID. In one example, the identical components may have different versions of the component in the first computing system 104 and the second computing system 106. For example, the first computing system 104 and the second computing system 106 may individually include NIC 1.

In one example of the present subject matter, the first BMC, the second BMC or both may receive an update request to update one or more components of the first computing system 104, the second computing system 106 or both from the management controller 108. In one example, the first BMC, the second BMC or both may receive, along with the update request, update parameters associated with the update request. The update parameters may indicate the details about the update to be performed on the components of the first computing system 104, the second computing system 106 or both. The first BMC and the second BMC may store the update parameters at their respective memory locations (as represented by the memory 24 in FIG. 2). In one example, the update request may indicate availability of software updates. In another example, the update request may not indicate availability of software updates.

For the sake of explanation, the forthcoming description is described considering that the update requests received by the first BMC, the second BMC or both does not include information about the availability of software updates.

In one example, the first BMC may identify the components and determine the status of the components (i.e., the status of payload bits for updating the components) of the first computing system 104 and the second BMC may identify the components and determine the status of the components of the second computing system 106. A status of each component of the first computing system 104 and the second computing system 106 may be staged or non-staged. In one example, the first BMC may identify a first component of the first computing system 104 and further identify that a status of the first component is staged. The second BMC may identify a second component of the second computing system and further identify that a status of the second component is non-staged. On identifying the status of the first component, the first BMC of the first computing system 104 may broadcast the status of the first component to the second computing system 106 via the network protocol. Along with the status of the first component, the first BMC may broadcast other details including, but are not limited to, unique identification of the first component and version of the first component. The second BMC of the second computing system 106 may be capable of recognize that the first component is identical to the second component and the status of the first component is staged. Such communication between the first BMC and the second BMC may be enabled via the network protocol. This way, the first computing system 104 and the second computing system 106 may communicate with each other through the first BMC and the second BMC via the network protocol.

Based on the above determination and identification, in one example, the second BMC may instruct the second computing system 106 to access software payload bits from the first component and copy them to the second computing system 106 for staging. That is, the second BMC may send instructions to the second computing system 106 for staging the second component from the first computing system 104. Such instructions may be stored in a memory location (for example, the non-volatile memory 24 in FIG. 2) of the second computing system 106 and executed on or after receiving the update request.

In another example, the update request received by the first BMC, the second BMC or both from the management controller 108 may further indicate availability of software updates. In said examples, information and location of a host that can provide the payload bits may be associated with the update request.

For the sake of explanation, the forthcoming description is described considering that the update request merely indicate availability of payload bits for updating the second component of the second computing system 106. In such situations, the update request may also include available host details, such as an Internet Protocol (IP) address of the first computing system 104, from where the software package can be accessed.

In such example, the management controller 108 may be capable of retrieving an inventory information of the components of the first computing system 104 and the second computing system 106 individually through the first BMC and the second BMC. In one example, the management controller 108 may retrieve the inventory information of the first component and the second component. Based on the inventory information, the management controller 108 may generate an inventory database that may include one or more information including the names of components, the versions of components, unique identifications of the components, one or more computing systems on which a component is staged, and one or more computing system on which the component is not staged. From the inventory database, the management controller 108 may identify the first component of the first computing system 104 and the second component of the second computing system 106. In one example, the management controller 108 may determine, from the inventory database, that (i) a status of the first component of the first computing system 104 may be staged, (ii) a status of the second component of the second computing system 106 may be non-staged, and (iii) the second component is identical to the first component. Based on such information, the management controller 108 may send instructions to the second BMC for staging the second component from the first computing system 104 to install software updates.

Figure 4:
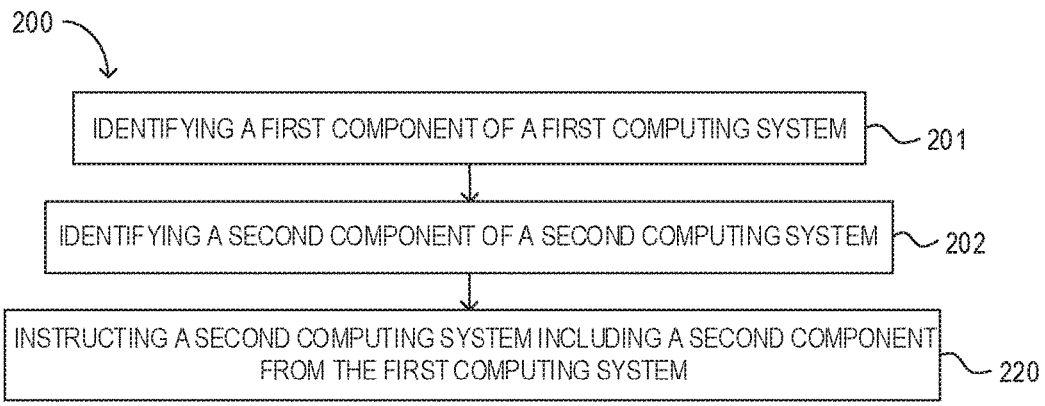
FIG. 4 illustrates a flowchart of an example method that includes organizing a plurality of computing systems for staging computing systems of the plurality of computing systems with one another for installing software updates.

In one example, the management controller 108 may include a processing resource 130 and a memory resource 132 storing a non-transitory computer readable medium, as illustrated in FIG. 4. The processing resource 130 may be a central processing unit (CPU), microprocessor, and/or other hardware device suitable for execution of a set of instructions (134, 136 and 138) stored in non-transitory computer readable storage medium, as illustrated in FIG. 4. The set of instructions (134, 136 and 138) executable by the processing resource 130 may cause the processing resource 130 to execute the functionality described herein.

As an alternative or in addition to executing the set of instructions (134, 136 and 138), the processing resource 130 may include an electronic circuit comprising a number of electronic components for performing the operations of the instructions in computer readable storage medium. With respect to the executable instruction representations or boxes described and shown herein, it should be understood that part or all of the executable instructions included within one box may be included in a different box shown in the figures or in a different box not shown.

The memory resource 132 may be any electronic, magnetic, optical, or other physical storage device that stores executable set of instructions. Thus, computer readable storage medium may be, for example, Random Access Memory (RAM), an Electrically-Erasable Programmable Read-Only Memory (EEPROM), a storage drive, an optical disc, and the like. The executable set of instructions (134, 136 and 138) may be "installed" on the management controller 108 as illustrated in FIG. 4. The computer readable storage medium may be a portable, external or remote storage medium, for example, that allows the management controller 108 to download the set of instructions (134, 136 and 138) from the portable, external, or remote storage medium. In this situation, the executable set of instructions (134, 136 and 138) may be part of an "installation package". As described herein, the computer readable storage medium may be encoded with executable set of instructions (134, 136 and 138) for organizing the first computing system 104 and the second computing system 106 to stage from each other for installing software updates.

The instruction 134, when executed by a processor such as processing resource 130, may cause the management controller 108 to retrieve inventory information of the components from the first computing system 104 and the second computing system 106. The inventory information of the components may be provided by the first BMC and the second BMC to the management controller 108 using a user interface or an automatic interface, for example Application Program Interface (API) or Simple Object Access Protocol (SOAP). Tables 1 and 2 are examples of inventory information provided by the first BMC and the second BMC to the management controller 108. The inventory information may include one or more information including names of the components, unique identifications (e.g., GUID) of the components, the versions of the components, and the status of the components. The inventory information may be retrieved either prior to or after receiving the request for the updates.

The instruction 136, when executed by the processing resource 130, may cause the management controller 108 to determine the first component of the first computing system 105 and the second component of the second computing system 106. In one example, based on the inventory information retrieved by the management controller 108, the management controller 108 may generate an inventory database that may be stored in the memory resource 132. In said example, the inventory database may include one or more information that include that the first component of the first computing system 104 may be staged, the second component of the computing system 106, which is identical to the first component, may be non-staged. For example, Table 3 may show an example of an inventory database that may include the name of components, the version of components, unique identification of the components, one or more computing systems (for example, a server) on which a component is staged, and one or more computing system on which the component (i.e., identical component) is not staged.

As noted, in one example, the management controller 108, from the inventory database, may determine that the first component of the first computing system 104 is staged, the second component of the second computing system 106 is non-staged, and the second component is identical to the first component. Based on above information, the management controller 108 may further identify that the second component may be staged from the first computing system 104.

The instruction 138, when executed by the processing resource 130, may cause the management controller 108 to send instructions to the second computing system to stage the second component from the first computing system 104 based on the information from the inventory database. These instructions may be stored in the non-volatile memory of the second computing system 106 and may be executed by the second BMC on or after receiving the update request.

In one example, one or more sets of computing systems can be identified from the plurality of computing systems by the management controller 108 based on the inventory information collected from each computing system. The one or more sets of computing systems may be determined such that all computing systems of each set of computing systems have identical components. Each set of computing systems may have a multicast address and may be referred to as federation group. In said example, the management controller 108 may send instructions to a set of computing systems to stage the components of the computing systems of the set of computing systems from another set of the computing systems. In one example, the computing systems of a set of computing systems may stage from a computing system of the same set of the computing systems.

In one example of the present subject matter, the second computing system 106 may further include a third component that needs to be updated. That is, the status of the third component is non-staged. In one example, the first computing system 104 may not include a component identical to the third component. In another example, the first computing system 104 may include a component identical to the third component but the status of the identical component is non-staged. In other words, the payload bits to be copied to the third component for software updates, may not be available in the first computing system 104. In such examples, the third component may be staged from the management controller 108. In one example, the management controller 108 may send instructions to the second computing system 106 for staging the third component from the management controller 108.

In one example, the described systems and methods may be utilized for organizing multiple computing systems in a datacenter. In such example, a computing system may be organized to stage from one or more neighboring computing systems of the plurality of computing systems for updating its one or more components.

FIG. 4 illustrates an example of a high level flow diagram for a method 200 for organizing a plurality of computing systems of a datacenter for installing software updates. The order in which the method 200 is described is not intended to be construed as a limitation, and any number of the described method blocks may be combined in any order to perform the method 200, or an alternative method. Furthermore, the steps of the method 200 may be performed by processor(s) of a management controller or computing system(s) through any suitable hardware, non-transitory machine readable instructions, or combination thereof.

In one example, the steps of the methods 200 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media Further, although the method 200 may be performed on the computing systems of the plurality of computing systems in a datacenter, the method 200 is explained in context of the aforementioned the first computing system 104 and the second computing system 106 in the datacenter 102 as described in FIG. 1, for ease of explanation. As described, the first computing system 104 may have the first component and the first BMC; and the second computing system 106 may have the second component and the second BMC. The status of the first component may be staged and the status of the second component may be non-staged.

Referring to FIG. 4, in an example of the present subject matter, at block 201, the method 200 may include identifying the first component of the first computing system 104. The method may include identifying the status of the first component 104 by the first BMC of the first computing system 104. The method may further includes broadcasting the status of the first component to the second computing system 106 and recognizing the first component by the second BMC of the second computing system 106. At block 202, the method may include identifying the second component of the second computing system 106. The method may include identifying the status of the second component by the second BMC of the second computing system 104. The method may further include identifying that the second component is identical to the first component. In another example, the method 200 may include identifying the first component (at block 201) and identifying the second component (at block 202) by the management controller 108. At block 220, the method 200 may include instructing the second computing system 106 for staging the second component from the first computing system 104. In said example, the second component may be identical to the first component. In one example, the instructions for staging may be sent by the second BMC of the second computing system 106 or by the management controller. These examples are further described in FIGS. 5 and 6 respectively.

Figure 5:
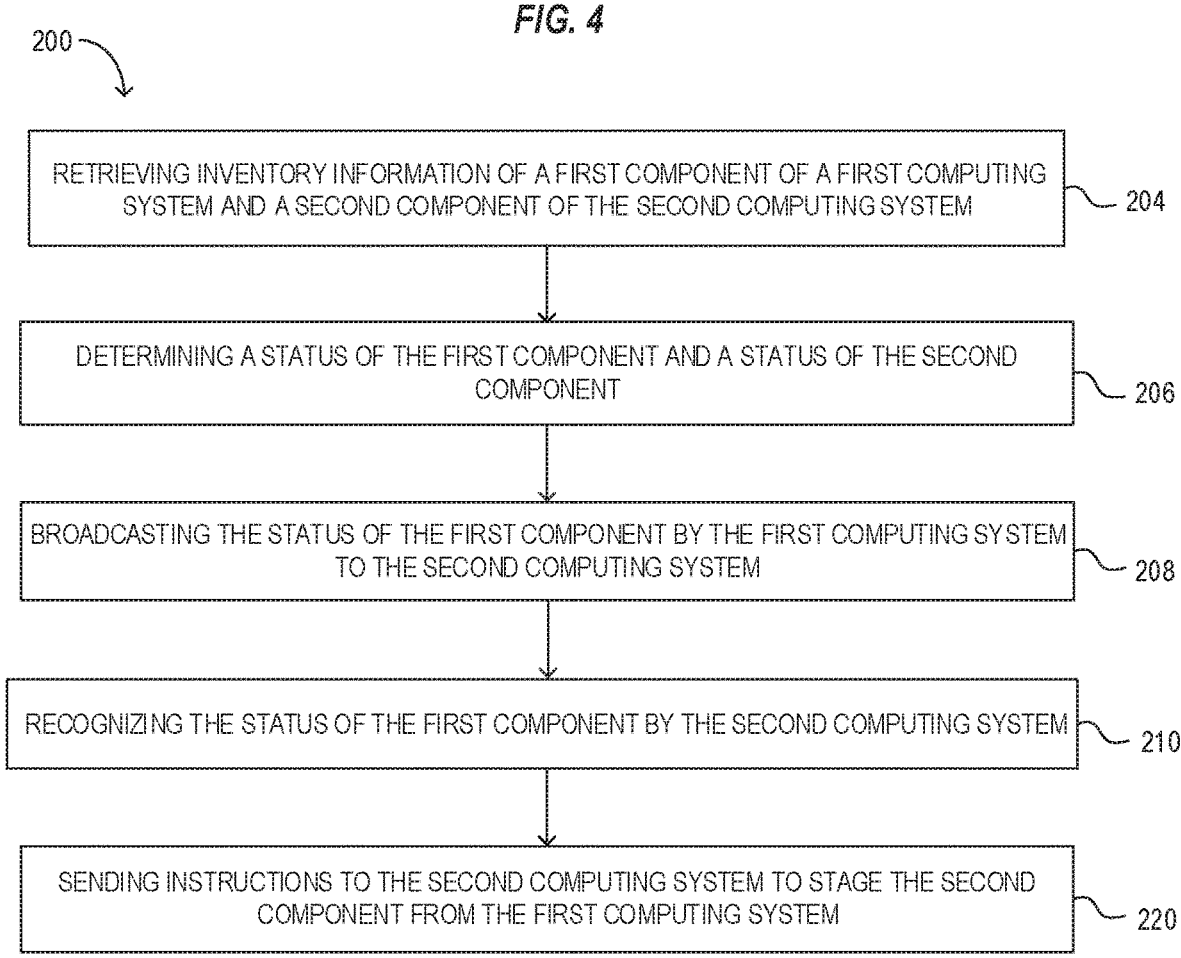
FIG. 5 illustrates a flowchart of an example method that includes identifying a first component of a first computing system by a second computing system for organizing the plurality of computing systems for staging.

FIG. 5 illustrates an example of a flow diagram for the method 200, in one example. At block 204, the method may include retrieving inventory information of the first component and the second component. The inventory information may be retrieved respectively by the first BMC and the second BMC. At block 206, the method 200 may include determining the status of the first component by the first BMC and the status of the second component by the second BMC based on the inventory information. The status of the first component may be staged and the status of the second component may be non-staged. At block 208, the method 200 may include broadcasting the status of the first component to the second computing system 106. On broadcasting the status of the first component, at block 210, the method 200 may include recognizing the status of the first component by the second BMC of the second computing system 106. The broadcasting and recognizing steps may be performed via the network protocol. At block 210, the method 200 may further include identifying the second component being identical to the first component by the second BMC. This identification may be performed by comparing unique identification of the first component and the second component. At block 220, the method may include instructing the second computing system 106 for staging the second component from the first computing system 104.

Figure 6:
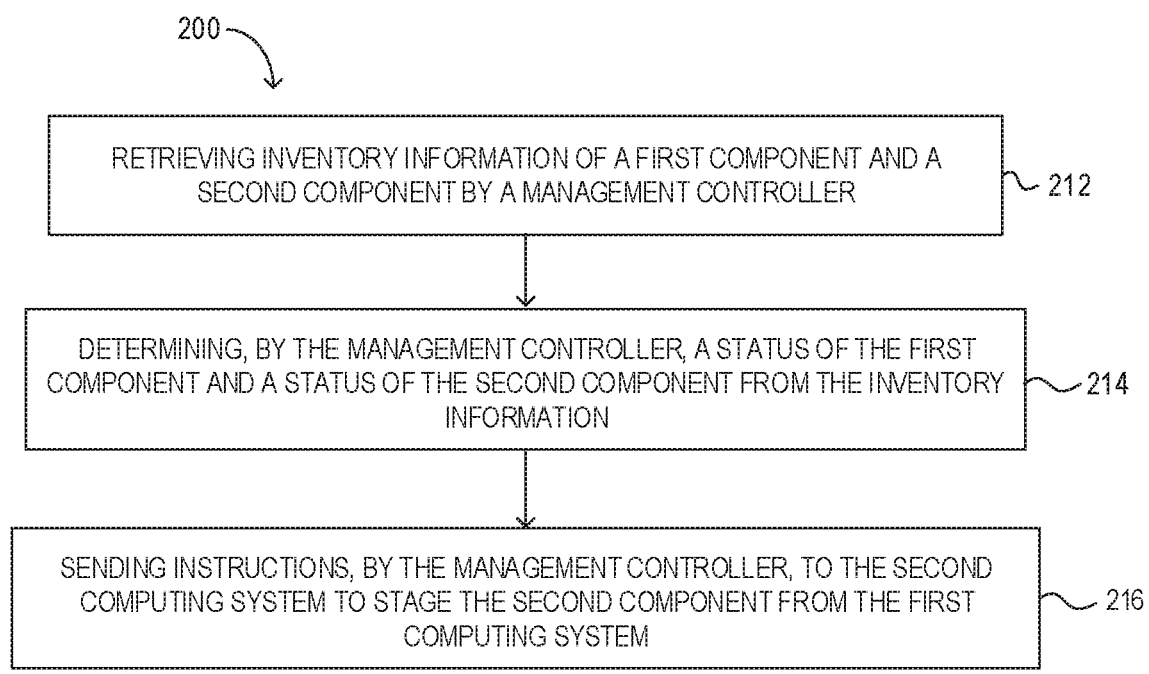
FIG. 6 illustrates a flowchart of an example method that includes identifying a first component of a first computing system and identifying a second component of a second computing system in the plurality of computing system for organizing the plurality of computing systems for staging.

FIG. 6 illustrates a flow diagram of another example for the method 200. In said example, at block 212, the method 200 includes retrieving inventory information, by the management controller 108, of the first component of the first computing system 104 and the second component of the second computing system 106. The inventory information (as discussed previously) may be provided to the management controller 108 respectively by the first BMC and the second BMC. At block 214, the method includes determining, by the management controller 108, the status of the first component and the status of the second component. The status of the first component and the second component may be determined from the inventory database generated by the management controller 108 from the inventory information. The management controller 108 may also determine from the inventory database that the first component and the second component are identical. Based on these determinations, the management controller 108, at block 216, may send instructions to the second computing system 106 to stage the second component from the first computing system 104 for installing the software updates. These instructions may be stored in non-volatile memory and executed on or after receiving the update request.

As an example, Table 1 and 2 show component details of Server 1 and Server 2 retrieved by their BMCs. For the sake of explanation, some components, for example NIC 1, NIC 2, BIOS, BMC and Power Management of Server 1 and Server 2 may be shown. Server 1 and Server 2 may further include more components. Further, Table 3 shows inventory database generated by a management controller based on inventory information retrieved by the management controller. Table 3 shows that NIC 1, BIOS, BMC and Power Management are staged on Server 1, and NIC 1, BIOS and Power Management are non-staged at Server 2. Further, NIC 2 at Server 2 is non-staged, however NIC 2 is not available at Server 1.

Thus Server 2 may be staged from Server 1 to update NIC 1, BIOS and Power Management at Server 2. And, NIC 2 of Server 2 may be staged from the management controller.

Server 1 and Server 2 may be organized as described above for staging for updating software on Servers 1 and 2.

TABLE 1

Component details of Server 1

| Component | Component GUID | Version | Staged |
|---|---|---|---|
| NIC1 | X0011 | 3.2 | Y |
| BMC | X0012 | 1.4 | Y |
| BIOS | X0014 | 4.1 | Y |
| Power Management | X0015 | 4.1 | Y |

TABLE 2

Component details of Server 2

| Component | Component GUID | Version | Staged |
|---|---|---|---|
| NIC1 | X0011 | 3.2 | N |
| NIC2 | X0011 | 4.1 | N |
| BMC | X0012 | 1.4 | Y |
| BIOS | X0014 | 4.1 | N |
| Power Management | X0015 | 4.1 | N |

TABLE 3

Inventory Database generated by Management Controller

| Component | Component GUID | Version | Sever having staged component | Applicable Server having non-staged component |
|---|---|---|---|---|
| NIC1 | X0011 | 3.2 | Server 1 | Server 2 |
| NIC2 | X0011 | 4.1 | | Server 2 |
| BMC | X0012 | 1.4 | Server 1, 2 | |
| BIOS | X0014 | 4.10 | Server 1 | Server 2 |
| Power Management | X0015 | 4.1 | Server 1 | Server 2 |

As described above, the methods and systems of the present subject matter, may enable the installation of software updates of multiple computing systems by organizing (pre-staging) the computing systems for staging from one another instead from the management controller and thus reduce the installation of the updates from the management controller. As a result, the update process may not consume large bandwidth of the management controller and thus may reduce network traffic and load on the management controller. Furthermore, since the plurality of computing systems are organized, in advance, on or prior to receiving the update request, time consumed in staging may be reduced, which accelerates installation of software updates and reduces overall downtime for the updates. Thus, the described methods and systems may provide an efficient and accelerated software updates mechanism.

Various examples described herein are described in the general context of method steps or processes, which may be implemented in one example by a software program product or component, embodied in a machine-readable medium, including executable instructions, such as program code, executed by entities in networked environments. Generally, program modules may include routines, programs, objects, components, data structures, etc. which may be designed to perform particular tasks or implement particular abstract data types. Executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

What is claimed is:

1. A method of organizing a plurality of computing systems for installing software updates, comprising:
retrieving, by a management controller in communication with the plurality of computing systems, inventory information of a first component of a first computing system and a second component of a second computing system of the plurality of computing systems;
identifying, by the management controller, that the payload bits of a software package for the software updates are copied to the first component, based on the inventory information of the first component;
identifying, by the management controller, that the payload bits of the software package are not copied to second component, based on the inventory information of the second component; and
sending, by the management controller, instructions to a second board management controller of the second computing system for staging the second component from the first computing system to copy the payload bits of the software package on the second component.

2. The method of claim 1, wherein the software updates comprise a software update, a firmware update or a combination thereof.

3. The method of claim 1, wherein the second computing system is capable of staging the second component from the first computing system via a network protocol.

4. The method of claim 1, wherein the inventory information of the first component comprises information identifying that the payload bits of the software package are copied to the first component and the inventory information of the second component comprises information identifying that the payload bits of the software package are not copied to the second component.

5. The method of claim 4, wherein the inventory information of the first component and the second component, individually, further comprises respective unique identifiers and versions of the respective first component and the second component.

6. The method of claim 1, further comprising identifying, by the management controller, that the second component is identical to the first component, based on the inventory information of each of the first component and the second component.

7. The method of claim 1, further comprising:
identifying, by the management controller, that a third component of the second computing system is not identical to the first component and the payload bits of another software package for the software updates are not copied to the third component, based on inventory information of the third component; and
sending, by the management controller, instructions to the second board management controller of the second computing system for staging the third component from the management controller to copy the payload bits of the other software package on the third component.

8. The method of claim 1, further comprising:
identifying, by the management controller, a set of computing systems in the plurality of computing systems, wherein the set of computing systems has a multicast address and wherein each computing system of the set of computing systems has a component identical to the first component;
identifying, by the management controller, that the payload bits of the software package are not copied on the component of each computing system of the set of computing systems, based on inventory information of the component; and
sending, by the management controller, instructions to a board management controller of each computing system of the set of computing systems for staging the component of the computing system from the first computing system to copy the payload bits of the software package on the component.

9. A non-transitory computer readable medium containing a set of instructions executable by a processing resource to cause the processing resource to:
retrieve inventory information of a first component of a first computing system and a second component of a second computing system of a plurality of computing systems;
identify, based on the inventory information of the first component, that the payload bits of a software package for software updates, to be installed on the plurality of computing systems, are copied to the first component;
identify, based on the inventory information of the second component, that the payload bits of the software package are not copied on the second component and the second component is identical to the first component; and
send instructions to a second board management controller of the second computing system for staging the second component from the first computing system to copy the payload bits of the software package on the second component.

10. The medium of claim 9, further comprising instructions to cause the processing resource to:
identify, based on inventory information of a third component of the second computing system, that the third component is not identical to the first component and the payload bits of another software package of the software updates are not copied on the third component; and
send instructions to the second board management controller of the second computing system for staging the third component from the management controller to copy the payload bits of the other software package on the third component.

* * * * *